United States Patent [19]

de Koning

[11] 4,277,877
[45] Jul. 14, 1981

[54] METHOD FOR MOUNTING A REPLACEMENT SHOCK ABSORBER

[75] Inventor: Martinus de Koning, Oud-Beijerland, Netherlands

[73] Assignee: ITT Industries, Inc., New York, N.Y.

[21] Appl. No.: 75,210

[22] Filed: Sep. 13, 1979

[30] Foreign Application Priority Data

Sep. 22, 1978 [NL] Netherlands ......................... 7809636

[51] Int. Cl.³ .............................................. B23P 7/00
[52] U.S. Cl. .............................. 29/402.08; 29/402.06; 29/402.03
[58] Field of Search ............. 29/401.1, 402.01, 402.12, 29/402.03, 402.08, 402.06

[56] References Cited
PUBLICATIONS

J. C. Whitney & Co., Catalog No. 306 @1972, pp. 144, 145.

Primary Examiner—Ervin M. Combs
Assistant Examiner—V. K. Rising
Attorney, Agent, or Firm—James B. Raden; William J. Michals

[57] ABSTRACT

A method for the replacement of worn damping parts of a wheel suspension system comprising a housing with a closed bottom and a non-dismantable top cover wherein the original housing is salvaged by removing a part of the top side of the housing and drilling a hole into the bottom. A complete replacement shock absorber is inserted into the housing and fastened through the bottom hole of the housing.

2 Claims, 3 Drawing Figures

METHOD FOR MOUNTING A REPLACEMENT SHOCK ABSORBER

BACKGROUND OF THE INVENTION

This invention relates to a method for the fixing of a replacement shock absorber to replace the elements necessary for the damping action in a wheel suspension system which is provided with a housing closed at the bottom, to which a wheel carrier is connected and in which the housing comprises at the top a non-removable cylinder cover while the elements inside the housing necessary for the damping action at least consist of a piston in a cylinder connected by means of a piston rod passing through the cylinder cover to a part of the carriage to be carried by the wheel, in which the piston in the cylinder and the cylinder rod in the cylinder cover form guides for the wheel support system.

In such wheel suspension system in which the cylinder cover is arranged in a non-detachable way it is not possible to remove the parts designed for the shock absorbing action, for instance after wear, out of the housing by demounting and replacing them by new parts or by a preassembled shock absorber unit, so the costly wheel suspension system has therefore to be replaced in its whole.

It is an object of the present invention to provide a method for-even repeatedly-replacing the parts of the shock absorber in a non-detachable wheel suspension system.

SUMMARY OF THE INVENTION

The method according to the present invention is characterized in that the portion of the top side of the housing which encloses the cylinder cover in a non-detachable way is removed by machining and that after having removed the elements necessary for the damping action out of the housing, a bore is made in the bottom side of the housing, after which a replacement shock absorber unit is inserted from the top into the housing whereby the cylinder cover of the replacement shock absorber unit fits interferingly in the top side of the housing and after which the shock absorber unit is secured to the housing by means of a fastener through the bore in the bottom side of the housing.

The present invention provides for the possibility of replacing defective parts of the shock absorber by a shock absorber unit under retention of the original housing. In a preferred embodiment of the replacement shock absorber, the peripheral portion of the cylinder cover is provided with a rough surface such as a mill.

BRIEF DESCRIPTION OF THE DRAWING

Embodiments of the invention will now be described by way of example with reference to the accompanying drawing in which.

DETAILED DESCRIPTION

Figure 1:
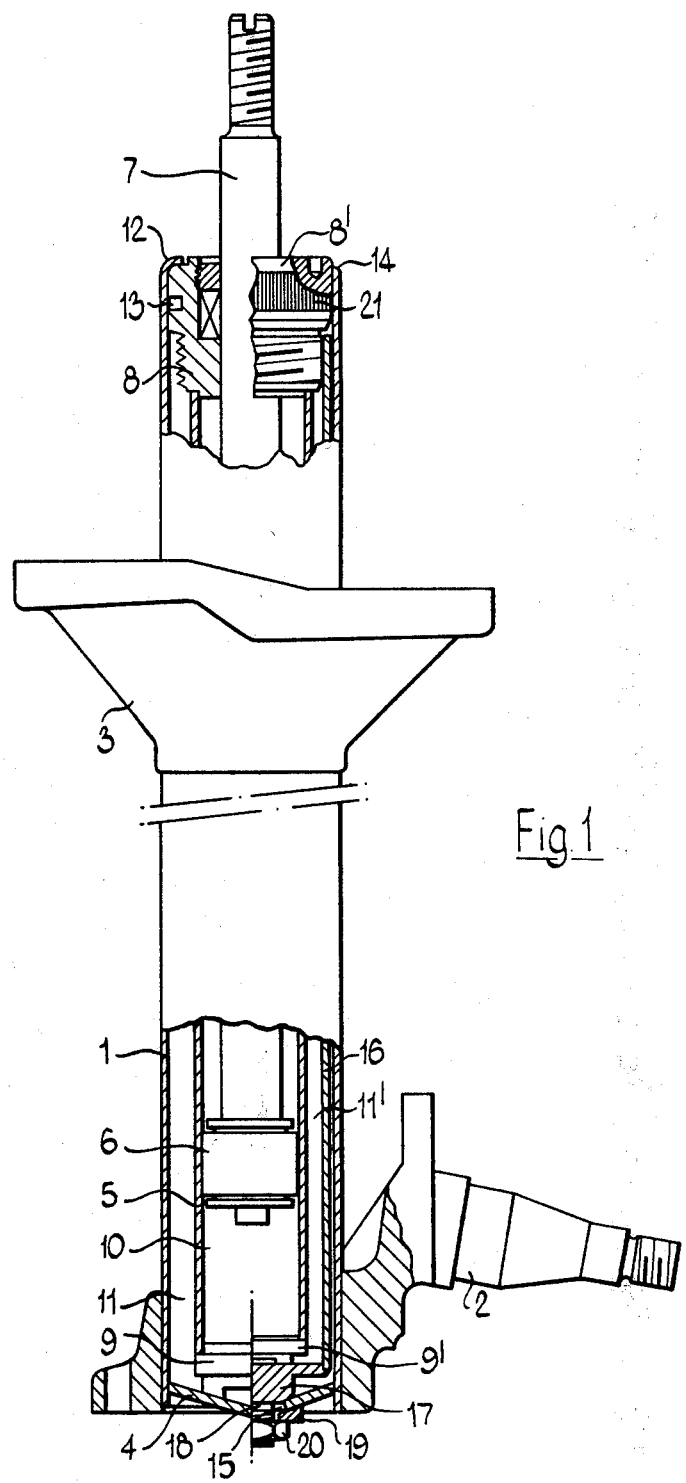
FIG. 1 provides a longitudinal sectional view of a wheel suspension system, the left half of the sectional view showing a non-detachable arrangement. The right half of the sectional view shows a wheel suspension system after the method according to the present invention is applied; and, FIGS. 2 and 3 illustrate enlarged scale details of the wheel suspension system according to the right half of FIG. 1.
Figure 2:
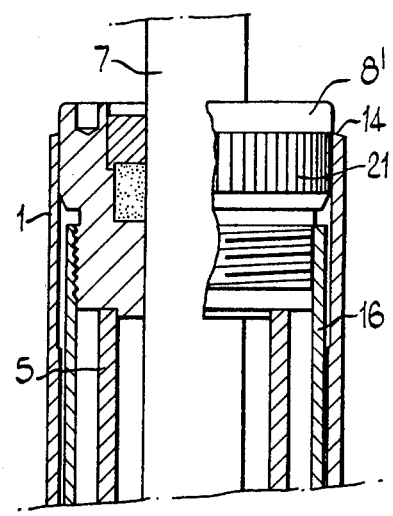
Figure 3:
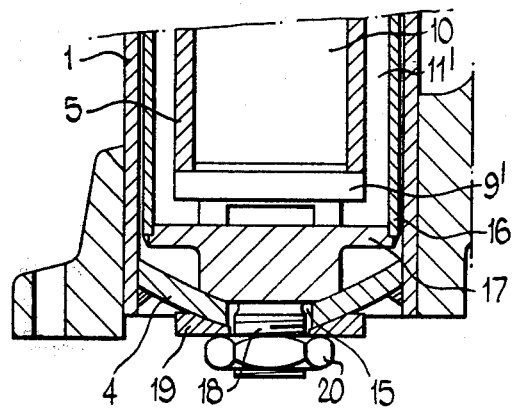

In all figures 1 is the housing of a wheel suspension system of a vehicle to which the wheel carrier 2 and the spring seat 3 for supporting a vehicle support spring are attached. In the housing 1 which is provided with a closed bottom 4, a cylinder 5 is arranged in which a piston 6 can reciprocate by means of a piston rod 7 which is guided through the cylinder cover 8 to the exterior of the housing 1 and the end of which should be attached to a vehicle part to be carried by the wheel. Between the bottom 4 of the housing 1 and the cylinder 5 a bottom valve 9 may be arranged which provides in case of a double tube shock absorber a connection between the cylinder compartment 10 and a reservoir 11 for the damping fluid, arranged between the cylinder 5 and the housing 1. The parts arranged in the housing 1 and designed for guiding as well as absorbing action are enclosed in a non-detachable way in the housing 1 by folding the top rim 12 of the housing 1 in such a way that the cylinder cover 8 is partly enclosed as is shown in the left half of the sectional view of FIG. 1. Hereby the reservoir room 11 is sealed to the exterior with a sealing ring 13.

In the right half of the sectional view according to FIG. 1 the method according to the present invention is applied in which the enclosing portion 12 of the housing is removed by sawing, grinding or the like machining, in such a way that a new upper rim 14 in a lower position is formed on the housing 1.

Subsequently a bore 15 is machined in the bottom of the housing 1. A replacement shock absorber unit, comprising a cylinder 5, a piston 6, a piston rod 7, a cylinder cover 8' and a bottom valve 9' and provided with a casing 16 having a bottom 17 secured to the cylinder cover 8', is inserted from the top into the housing 1 whereby a stud 18 attached to the bottom 17 extends through bore 15 and in the present embodiment is provided with a washer 19 and a nut 20 so as to fasten the replacement shock absorber unit to the housing 1.

Over part of its periphery the cylinder cover 8' is provided with a mill 21 so as to cope with tolerances between the cylinder cover 8' and the housing 1 and providing a mounting which is tolerance free in a radial direction.

The reservoir room is now provided by the room 11' between the cylinder 5 and the casing 16. A seal such as ring 13 in the left half of the sectional view in FIG. 1 is now superfluous.

What is claimed is:

1. A method for mounting a replacement shock absorber to replace the elements necessary for the damping action in a wheel suspension system which is provided with a housing which is closed at the bottom, to which a wheel carrier is connected and in which the housing comprises at the top a non-removable cylinder cover while the elements inside the housing for the damping action comprise a piston in a cylinder connected by means of a piston rod passing through the cylinder cover to a part of the carriage to be carried by the wheel, and in which the piston in the cylinder and the cylinder rod in the cylinder cover form guides for the wheel suspension system, said method comprising the steps of removing the portion of the top side of the housing which encloses the cylinder cover in a non-detachable way by machining, removing the damping action elements from the housing, providing a bore in the bottom side of the housing, thereafter inserting a replacement shock absorber unit from the top into the housing whereby the cylinder cover of the replacement shock absorber unit interferingly fits in the top side of the housing, and securing the shock absorber unit to the housing by means of a fastener through the bore of the bottom side of the housing.

2. The method according to claim 1 including the step of providing a rough surface at the peripheral portion of the cylinder cover.

* * * * *